US012768309B2

(12) United States Patent
Ho

(10) Patent No.: US 12,768,309 B2
(45) Date of Patent: Oct. 20, 2026

(54) FLUID SUPPLY DEVICE AND FLUID SUPPLY UNIT FOR INCREASING COMBUSTION EFFICIENCY

(71) Applicant: Hao Wei Environmental Technology Co., Ltd., Taipei City (TW)

(72) Inventor: Chao-Wei Ho, Taipei City (TW)

(73) Assignee: HAO WEI ENVIRONMENTAL TECHNOLOGY CO., LTD., Taipei City (TW)

( * ) Notice: Subject to any disclaimer, the term of this patent is extended or adjusted under 35 U.S.C. 154(b) by 0 days.

(21) Appl. No.: 19/185,666

(22) Filed: Apr. 22, 2025

(65) Prior Publication Data

US 2025/0334082 A1 Oct. 30, 2025

(30) Foreign Application Priority Data

Apr. 26, 2024 (TW) ................................ 113204276
Dec. 31, 2024 (TW) ................................ 113151754

(51) Int. Cl.
*B60T 7/12* (2006.01)
*F02D 19/12* (2006.01)
*F02D 28/00* (2006.01)
*F02M 25/00* (2006.01)

(52) U.S. Cl.
CPC ............. *F02D 19/12* (2013.01); *F02D 28/00* (2013.01); *F02M 25/00* (2013.01)

(58) Field of Classification Search
CPC ....... F02M 27/02; F02M 27/06; B01J 19/128; G01N 21/359
USPC .......................................................... 701/103
See application file for complete search history.

(56) References Cited

U.S. PATENT DOCUMENTS 10,371,105 B1 * 8/2019 Grovatt .................. F02M 27/06
11,713,737 B1 * 8/2023 Kuo ....................... F02M 29/04 123/2
2007/0193537 A1 * 8/2007 Miyasaka .............. B01J 8/0221 422/600
2012/0061232 A1 * 3/2012 Wey .......................... C25B 1/02 422/186

FOREIGN PATENT DOCUMENTS

TW M601280 U 9/2020

* cited by examiner

*Primary Examiner* — Logan M Kraft
*Assistant Examiner* — James J Kim
(74) *Attorney, Agent, or Firm* — ALSTON & BIRD LLP

(57) ABSTRACT

A fluid supply device for improving combustion efficiency is provided. The fluid supply device includes a controller and a fluid supply unit coupled to the controller. The fluid supply unit includes an outer housing and a container body having a resonance material, wherein the container body is configured in the outer housing and has a containing space for accommodating a target liquid, and the resonance material is configured adjacent to the target liquid. The resonance material has an infrared ray wavelength to rearrange molecules of the target liquid in the container body to small molecules to increase the combustion efficiency of an internal/external combustion machine, and the controller can adjust the supply volume of the target liquid according to a predefined rule based on an obtained information from the fluid supply unit and/or the internal/external combustion machines, so that the internal/external combustion machine can achieve the best combustion efficiency.

20 Claims, 6 Drawing Sheets

FLUID SUPPLY DEVICE AND FLUID SUPPLY UNIT FOR INCREASING COMBUSTION EFFICIENCY

CROSS-REFERENCE TO RELATED APPLICATIONS

This application claims the benefit of Taiwan Application No. 113204276, filed on Apr. 26, 2024, and Taiwan Application No. 113151754, filed on Dec. 31, 2024, at the Taiwan Intellectual Property Office, the disclosures of which are incorporated herein in their entirety by reference.

FIELD OF THE INVENTION

The present invention is related to a liquid treatment device, especially a fluid supply device and a fluid supply unit for an internal/external combustion machine to increase combustion efficiency.

BACKGROUND

Internal and external combustion machines are devices that convert the thermal energy produced by the combustion reaction of fuel into mechanical energy. The internal and external combustion machines work by sending air into the machines from the intake manifold or other pipelines to mix with the fuel for combustion. The pressure increase caused by the expansion of the gas due to heat is then used to perform work on the driving mechanism. A photocatalyst is a catalyst that uses light energy to facilitate chemical reactions. Specifically, the photocatalyst transforms light energy into chemical energy under light irradiation, thereby promoting oxidation or reduction reactions of organic substances, which leads to synthesis or decomposition. Therefore, during the operation of internal and external combustion machines, the combustion reaction of fuel and air in the combustion chamber produces light, heat, water, and carbon dioxide. The light produced in this process includes infrared light, visible light, and a small amount of ultraviolet light. These light sources can further be used to catalyze photocatalytic reactions, acting as a combustion adjuvant.

However, in conventional technologies, the photocatalyst is in liquid form and can only be used as the combustion adjuvant for liquid fuels (such as gasoline, diesel, etc.), but cannot be applied to gaseous fuels (such as natural gas, etc.). Therefore, there is a need for a device that can atomize and/or vaporize liquids.

The fluid supply devices in the prior art have only one single fluid supply unit, thereby being capable of executing atomization or vaporization only for a kind of liquid. When there is a need for the atomization or vaporization for various kinds of liquids, there is a need for various kinds of fluid supply devices, correspondingly. Particularly, when there is a need to mix the atomized or vaporized fluid from different liquids depending on the actual usage, there is a need to control each of the fluid supply devices, respectively. This leads to the problem of inconvenience in control.

In view of the above, indeed, there is still a need to improve the prior-art fluid supply devices.

BRIEF SUMMARY

To solve the problem mentioned above, the purpose of the present invention is to provide a fluid supply device for increasing combustion efficiency, which integrates a plurality of fluid supply units to be user-friendly. In addition, the present invention also provides a liquid level warning lamp and a heating lamp for conveniently observing the status of the fluid supply device. Furthermore, the present invention provides a device or material that can further rearrange molecules of the liquid to small molecules, so that the liquid can be more easily atomized and/or vaporized.

The present invention utilizes vaporization technology to introduce a liquid nano-catalyst into the combustion chamber of the internal or external combustion machine, along with air through the intake manifold. After co-combustion with fossil fuels, the photocatalyst in the nano-catalyst comes into contact with the light and water (combustion products) generated by the engine combustion reaction. This triggers a photocatalytic water decomposition reaction, which decomposes the water into hydrogen and oxygen. Hydrogen serves as a secondary energy source and is used immediately after it is produced, so that more energy is generated, leading to fuel savings and a reduction in carbon emissions. Meanwhile, the oxygen can enhance combustion efficiency, and thus the pollution emissions of exhaust gases after combustion is reduced.

Another purpose of the present invention is to provide a fluid supply device for internal/external combustion machines which has the ability to improve combustion efficiency.

The directions or the similar phrases thereof described in the text of the present invention, such as “front”, “back”, “left”, “right”, “top”, “bottom”, “inner”, “outer”, “side”, and so on, mainly refer to the orientations in the appended drawings, and each direction or the similar phrase thereof is only used to assist in describing and understanding every embodiment of the present invention but not to limit the present invention.

The use of the word “a” or “one” in the components and members described in the text of the present specification is only for convenience in use and to provide the general meanings of the scope of the present specification. The word “a” or “one” should be interpreted as one or at least one in the present specification, and the single concept can refer to the multiple conditions as well, unless it apparently refers to other meanings.

The similar words, such as “connect”, “combine”, “assemble”, “arrange”, etc., described in the text of the present specification mainly refer to the form that the member can be separated without breaking or is inseparable after being connected, which can be chosen by the skilled person in the art according to the materials of the members intended to be connected or assembly requirements.

The phrase “internal/external combustion machine” described in the text of the present specification is the abbreviation of an internal combustion machine and/or an external combustion machine, and especially represents that the technical features of the present invention is applicable to the internal combustion machine and the external combustion machine.

The word “couple” described in the text of the present specification refers directly or indirectly to electrical and/or signaled connection, which can be selected by the skilled person in the art according to usage requirements.

The “controller” described in the text of the present specification may include at least one “processor”. The processor refers to all kinds of data processing devices having specific functions and implemented by hardware or both hardware and software to process and analyze information and/or generate corresponding control information, such as an electronic controller, a server, a cloud platform, a virtual machine, a desktop computer, a laptop computer, a tablet computer or a smartphone, etc., which can be understood by the skilled person in the art. The controller can further include a corresponding data receive or transmit unit to execute the receiving or transmitting of the required data. The controller can further include corresponding database/storage unit to store the required data. Particularly, unless there is any exclusion or contradiction, the processor can be an assembly of a plurality of processors based on a distributed system architecture for including/representing the process, mechanism, and results of information stream processing among the plurality of processors.

In accordance with an aspect of the present disclosure, a fluid supply device for increasing combustion efficiency is disclosed. The fluid supply device is applied to an internal combustion machine or an external combustion machine, and the internal combustion machine or the external combustion machine includes at least one detection device for sensing at least one feedback information. The fluid supply device includes: a controller; an air pump coupled with the controller; a plurality of fluid supply units configured in series, having a head end and a corresponding tail end; an intake pipe connected to the gas inlet of the fluid supply unit having the head end; a communicating pipe connected between two adjacent fluid supply units to cause the gas outlet of a preceding fluid supply unit to communicate with the gas inlet of a following fluid supply unit; and an exit pipe connected to the gas outlet of the fluid supply unit having the tail end, wherein the air pump is connected to the intake pipe or the exit pipe to drive the working fluid to flow through each of the fluid supply units and output from the exit pipe to form an output flow. Each of the fluid supply units includes: an outer housing; a container body disposed in the outer housing and having an inner wall and a containing space to accommodate a target liquid having target ingredients, wherein the target ingredients of the target liquids in the different fluid supply units are different, the container body has a liquid injection port, a gas inlet and a gas outlet, the liquid injection port is used for injecting therethrough the corresponding target liquid, and the gas inlet communicates with the gas outlet to define a circulating fluid-flow space for a working fluid; a resonance material disposed on the container body, wherein the resonance material has an infrared wavelength to rearrange molecules of the target liquid in the container body to small molecules; a valve unit coupled with the controller, arranged in the containing space and having an ON state and an OFF state, wherein when in the OFF state, the containing space is partially or entirely isolated from the fluid-flow space; and when in the ON state, the containing space and the fluid-flow space are no more isolated from each other; and a liquid level warning device disposed on the outer housing for displaying a level height of the respective target liquid. The controller adjusts an output power of the air pump and a state of each of the valve units based on a predefined rule according to the at least one feedback information provided by the at least one detection device, so as to change a supply amount of the different target ingredients.

The resonance material in the fluid supply device for increasing combustion efficiency of the present invention can be accommodated in a resonant device disposed on the inner wall of the container body, coated on the inner wall, or doped into materials forming the container body. The resonant material is graphene paint or graphene/metal composite materials. The resonant material has a wave frequency of $1.2\times10^{14}$ to $2.7\times10^{14}$ Hz. A wavelength of the infrared is between 1100-2500 nm or between 8-14 μm.

In accordance with another aspect of the present disclosure, a fluid supply device for increasing combustion efficiency is disclosed. The fluid supply device includes: a controller; an air pump coupled with the controller; and a plurality of the fluid supply units arranged in parallel, each further including a corresponding valve unit coupled with the controller, wherein: the intake pipe of each of the fluid supply units is connected with the air pump; the exit pipe of each of the fluid supply units is connected with a target device; each of the valve units has an ON state and an OFF state, wherein: when in the OFF state, the air pump stops driving the working fluid to flow out of the exit pipe; and when in the ON state, the air pump drives the working fluid to be outputted from the exit pipe; and the controller controls a magnitude of an output power of the air pump and the ON-OFF state of each of the valve units. Each of the fluid supply unit further includes an outer housing and a liquid level warning device disposed on the outer housing for displaying a level height of a target liquid. The container body has a resonance material, wherein the resonance material has an infrared wavelength to rearrange molecules of the target liquid in the container body to small molecules. The controller adjusts an output power of the air pump and time of the ON-OFF state of each of the valve units based on a predefined rule according to the at least one feedback information provided by the at least one detection device, so as to change a supply amount of the different target ingredients The resonance material in the fluid supply device for increasing combustion efficiency of the present invention can be coated on the inner wall, or doped into materials forming the container body. The resonant material is graphene paint or graphene/metal composite materials. The resonant material has a wave frequency of $1.2\times10^{14}$ to $2.7\times10^{14}$ Hz. A wavelength of the infrared is between 1100-2500 nm or between 8-14 μm.

Accordingly, the fluid supply device for increasing combustion efficiency of the present specification can provide a combination of different target liquids for the actual usage condition by arranging the plurality of fluid supply units in series or in parallel and configuring different target liquids and corresponding valve units therein, so as to have effects of convenience in use and control. When the target liquid is a combustion adjuvant, it further helps to improve the efficiency of the corresponding engine or combustion chamber.

In accordance with one more aspect of the present disclosure, a fluid supply unit for increasing combustion efficiency is disclosed. The fluid supply unit includes: an outer housing; a container body disposed in the outer housing and having an inner wall and a containing space to accommodate a target liquid having a liquid surface and target ingredients, wherein the container body has a resonance material having an infrared wavelength to rearrange molecules of the target liquid in the container body to small molecules; a liquid level warning device disposed on the outer housing to display a level height of a target liquid in the container body; an intake pipe mounted on the fluid supply unit and having an entrance end and an exit end, wherein: the entrance end is to flow therethrough a working fluid; and the exit end is arranged underneath the liquid surface; and an exit pipe communicating with the containing space in the container body. In this way, when the working fluid is ejected out of the exit end of the intake pipe, the corresponding gas is sprayed into the target liquid to facilitate the target liquid to be vaporized and atomized, so that the gas passing through the exit pipe may contain a higher concentration of target ingredients. In addition, a certain extent of disturbance or flowing can be generated in the target liquid and the mixing uniformity of the target ingredients can be increased in the target liquid by ejecting the gas into the target liquid. The resonance material can rearrange molecules of the target liquid to small molecules to increase the combustion efficiency of the internal combustion machine or the external combustion machine.

The resonance material in the fluid supply unit for increasing combustion efficiency of the present invention can be coated on the inner wall, or doped into materials forming the container body. The resonant material is graphene paint or graphene/metal composite materials. The resonant material has a wave frequency of $1.2\times10^{14}$ to $2.7\times10^{14}$ Hz. A wavelength of the infrared is between 1100-2500 nm or between 8-14 μm.

The liquid level warning device is a liquid level displaying tube connected to the containing space for displaying the level height of the respective target liquid in the containing space.

The liquid level warning device is a liquid level warning lamp coupled with the controller for emitting a warning light related to the level height of the respective target liquid.

The controller is configured to calculate a required time for the level height of each of the target liquid to be lower than a critical height according to a type of the respective target liquid, and control the liquid level warning lamp to emit the warning light when the required time arrives. In this way, the fluid supply unit can emit a warning light through the calculation of the controller to inform that the amount of the target liquid in the container body is running low.

The controller is configured to calculate a consumption of the respective target liquid during a working time of each of the fluid supply unit, and control the liquid level warning lamp to emit the warning light when the working time expires.

Each of the fluid supply units further includes a liquid level sensor disposed on the inner wall and coupled with the controller. The liquid level sensor is configured to transmit a warning signal to the controller when the level height is lower than a critical height, and the controller controls the liquid level warning lamp to emit the warning light. In this way, different liquid level sensors can be used to sense the liquid levels of different target liquids.

More particularly, each of the fluid supply units has a divider arranged around an inner side of a corresponding container body and forming a configuration of a funnel shape which is wide at the top and narrow at the bottom. The effect of helping to collect the target liquid can be achieved through the configuration of the funnel shape of the divider.

More particularly, the divider has a connection end and a free end, wherein the connection end is connected with the inner side of the container body, the free end extends downward from the connection end, and the free end forms a division opening. The effect of helping to collect the target liquid can be achieved through the configuration of the funnel shape formed by the connection end and the free end of the divider.

More particularly, each of the fluid supply units further includes: a temperature sensor disposed on the inner wall of the container body and coupled with the controller to sense a temperature of the target liquid or the containing space, and transmit the temperature to the controller; a heater coupled with the controller and arranged around the periphery of the container body to increase a temperature of the containing space; and a heating lamp disposed on the outer housing and coupled with the controller to emit a heating light when the heater is heating. The effect of vaporizing the target liquid is achieved through the temperature sensor and the heater. The heating status light can be used to indicate that the fluid supply unit is in a heating state. When the target liquid is a combustion adjuvant, the heater further improves the efficiency of the corresponding engine or combustion chamber.

More particularly, each of the fluid supply units has a heat insulation layer arranged around the periphery of the container body. The effect of maintaining the internal temperature of each of fluid supply units is achieved through the heat insulation layer.

More particularly, each of the fluid supply units has a heat insulation layer arranged around the periphery of the container body, and the heater is arranged between the container body and the heat insulation layer. The effect of maintaining the target liquid in the gaseous state is achieved by configuring of the heater and the heat insulation layer. When the target liquid is a combustion adjuvant, the heater and the heat insulation layer further improve the efficiency of the corresponding engine or combustion chamber.

More particularly, each of the fluid supply units has an oscillator coupled with the controller for causing the corresponding container body to generate a corresponding oscillation. The effect of mixing the target ingredients uniformly is achieved through the oscillator.

More particularly, each of the fluid supply units has an atomizer arranged in the container body and coupled with the controller to cause the target liquid to form the atomized liquid when the container body has corresponding liquid. The effect of causing the target liquid to form the atomized liquid is achieved through the atomizer. When the target liquid is a combustion adjuvant, the atomizer further improves the efficiency of the corresponding engine or combustion chamber.

More particularly, the fluid supply units for the internal/external combustion machine of the present specification further includes a first sensor coupled with the controller and arranged in the exit pipe of the fluid supply unit having the tail end to detect a flow rate and a pressure of the output flow of an interior of the exit pipe, wherein the controller adjusts an output power of the air pump and a state of each of the valve unit based on a predefined rule according to the flow rate and the pressure of the output flow obtained by the first sensor. The controller adjusts the air pump and each of the valve units in time according to the feedback signal from the first sensor, to output the corresponding fluid to a target device according to the predefined rule, which achieves the effects of controlling and facilitating the target device to exploit the output flow. When the target fluid is a combustion adjuvant, the first sensor improves the efficiency of the corresponding engine or combustion chamber.

More particularly, each of the target liquids is a combustion adjuvant. A combination of combustion adjuvants having the optimal ingredients is provided by the configuration of the fluid supply units of the present specification according to the current operating state, to achieve the effect of improving the efficiency of the corresponding engine or combustion chamber.

More particularly, the fluid supply device for internal/external combustion machine further includes: a second sensor arranged in a target device to sense operating information of an operating state of the target device, wherein: the output flow is outputted to the target device through the exit pipe; the controller adjusts the output power of the air pump and a state of each of the valve units based on a predefined rule according to the operating information obtained by the second sensor, wherein the first instance of the operating information is that: when the target device is an intake manifold, the operating information is a flow rate and a pressure of a fluid and/or concentration of the target ingredients in the intake manifold; when the target device is an engine of the internal combustion machine, the operating information is a rotating speed of the engine of the internal combustion machine; when the target device is a combustion chamber of the external combustion machine, the operating information is a firepower stage of the combustion chamber of the external combustion machine; and when the target device is the internal combustion machine or the external combustion machine, the operating information includes species and concentration of gases exhausted by the internal combustion machine or the external combustion machine; or the second instance of the operating information is at least one of (A) the flow rate and the pressure of the fluid, (B) the concentration of the target ingredients in the intake manifold, (C) the rotating speed of the engine of the internal combustion machine, (D) the firepower stage of the combustion chamber of the external combustion machine, and (E) the species and the concentration of the gases exhausted by the internal combustion machine or the external combustion machine.

BRIEF DESCRIPTION OF THE DRAWINGS

Other objectives, advantages and efficacies of the present invention will be described in detail below taken from the preferred embodiments with reference to the accompanying drawings.

DETAILED DESCRIPTION

Figure 1:
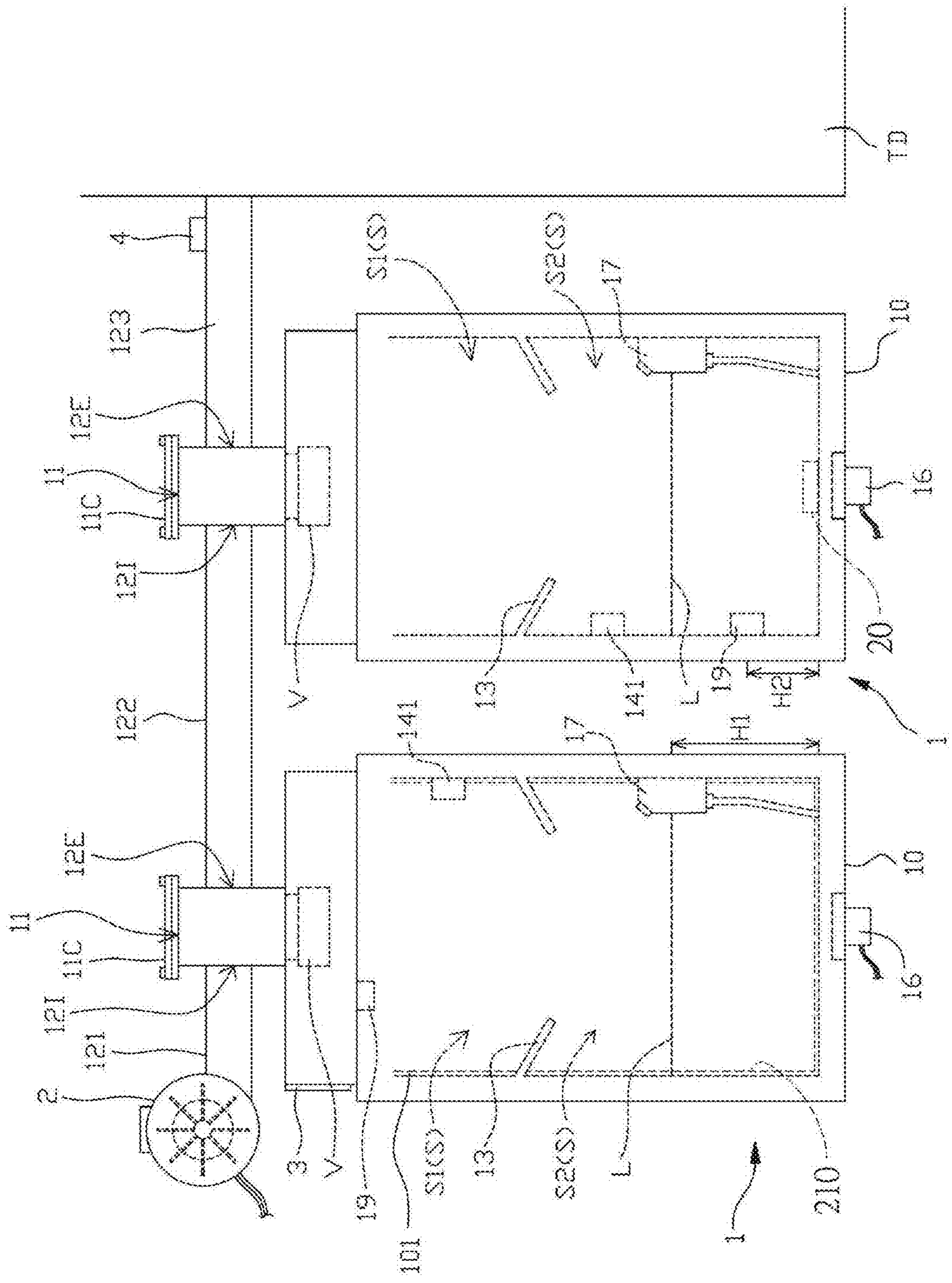
FIG. 1 shows the front view of the fluid supply device having two fluid supply units of the present invention.

The present invention will now be described more specifically with reference to the following embodiments. It is to be noted that the following descriptions of preferred embodiments of this invention are presented herein for purpose of illustration and description only; they are not intended to be exhaustive or to be limited to the precise form disclosed. In the preferred embodiments, the same reference numeral represents the same element in each embodiment.

Figure 2:
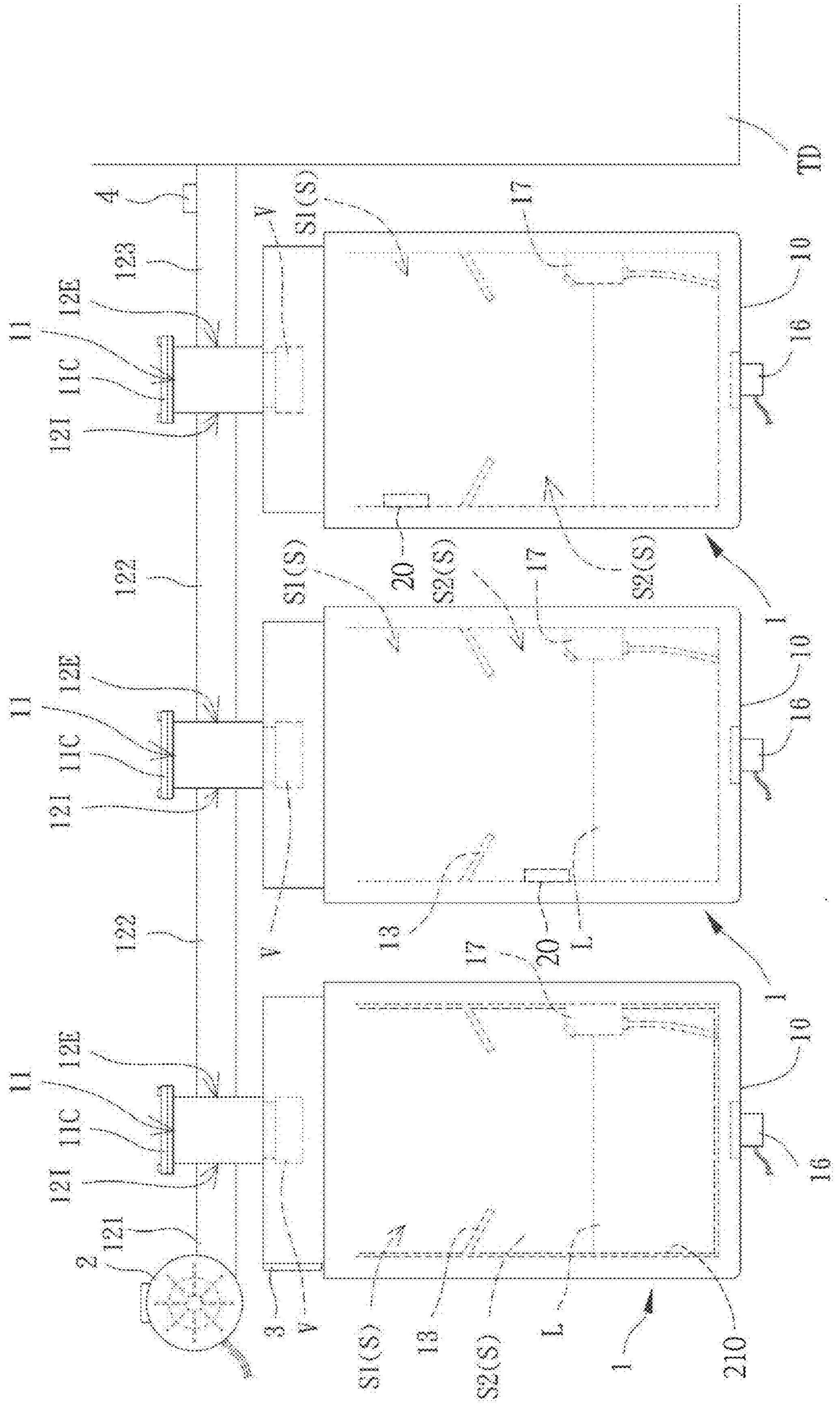
FIG. 2 shows the front view of the fluid supply device having three fluid supply units of the present invention.
Figure 3:
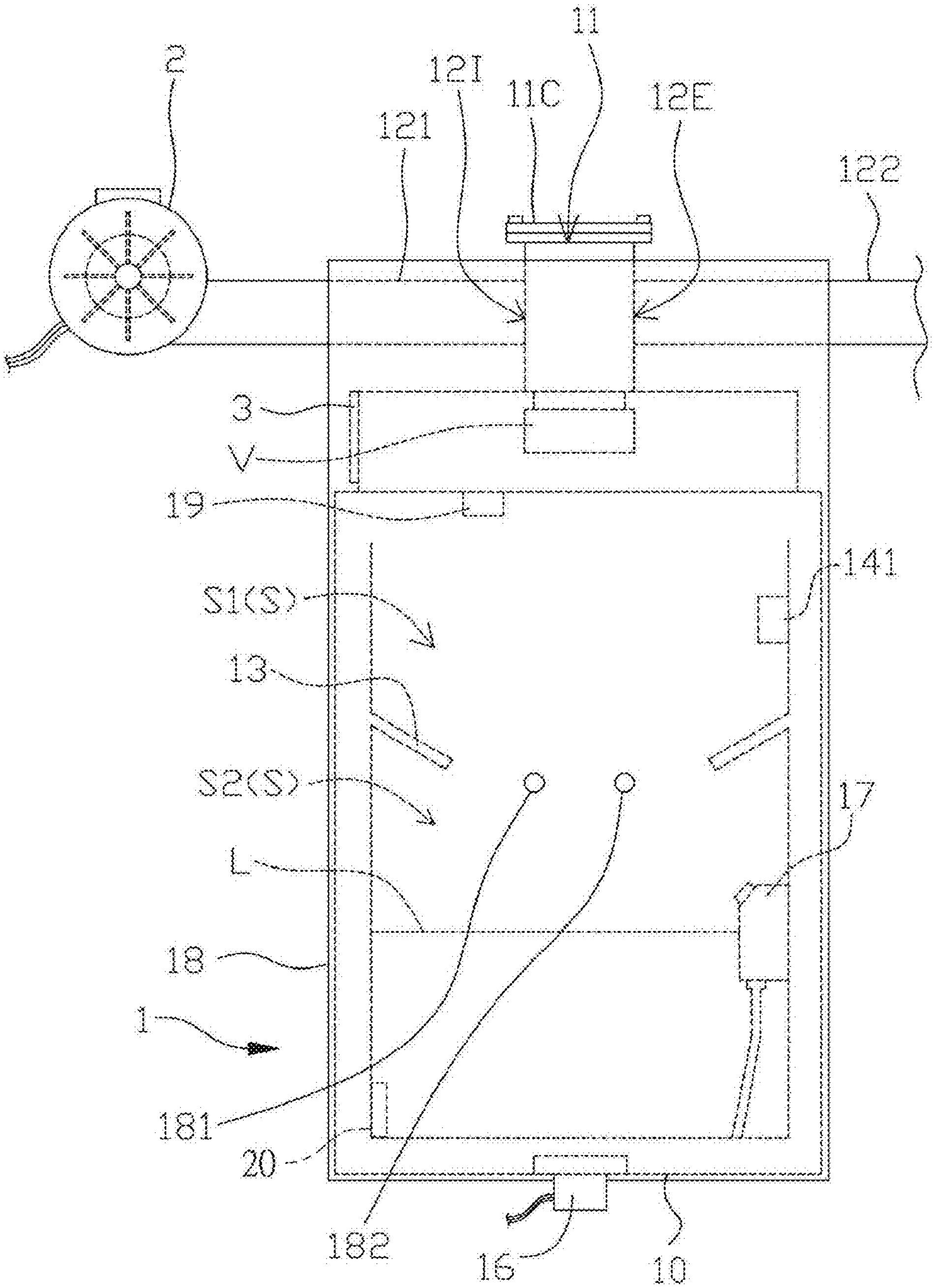
FIG. 3 shows the front view of the fluid supply unit of the present invention.
Figure 4:
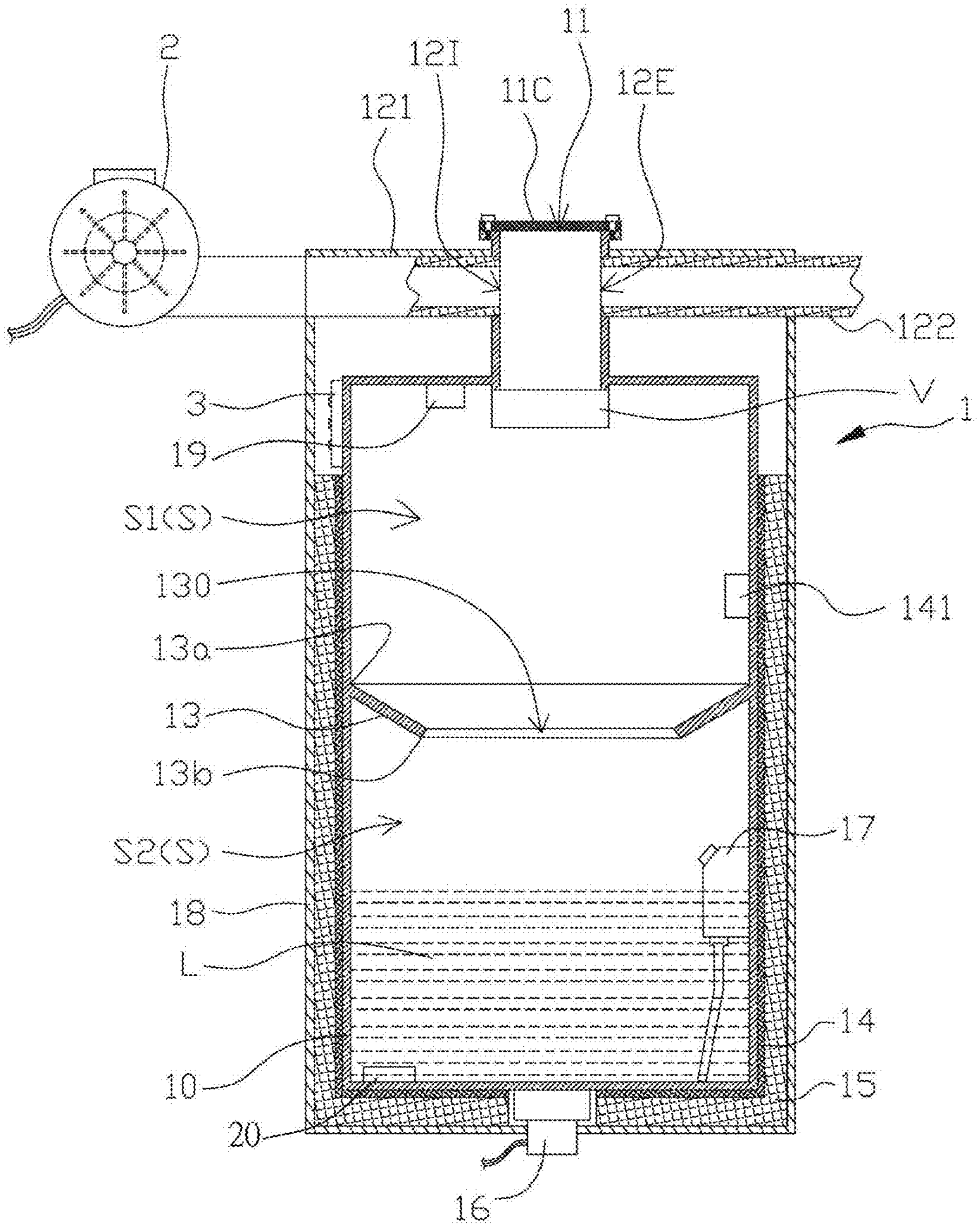
FIG. 4 shows the front section view of the fluid supply unit of the present invention.

Please refer to FIG. 1 to FIG. 3, wherein FIG. 1 and FIG. 2 are the front views of the fluid supply device for the internal/external combustion machine which can include a plurality of fluid supply units 1 of the present invention, FIG. 3 is the front view of the fluid supply unit 1 having the head end, and FIG. 3 is the front section view of the fluid supply unit 1 having the head end. The fluid supply device includes a plurality of fluid supply units 1, an air pump 2 and a controller 3. Those fluid supply units 1 are configured in series to form a head end and a tail end; the air pump 2 acts on the fluid supply units 1; and the controller 3 is coupled with the fluid supply units 1 and the air pump 2.

Each of the fluid supply units 1 includes an outer housing 18, a heating lamp 182 and a liquid level warning lamp 181 (as shown in FIG. 3). Inside the outer housing 18, each of the fluid supply units 1 includes a container body 10, a liquid injection port 11, a gas inlet 121, a gas outlet 12E, a valve unit V and a resonance material. The interior of the container body 10 has an inner wall 101 and a containing space S, the containing space S is configured to accommodate a target liquid L having the target ingredients, especially to accommodate the target liquid L and the gas and/or the atomized liquid formed by vaporizing and/or atomizing the target liquid L, and the gas formed by vaporizing the target liquid L has the corresponding target ingredients as well. The target liquids L (target ingredients) in different fluid supply units 1/container bodies 10 are different. The liquid injection port 11 is arranged at the top surface of the container body 10, and the corresponding target liquid L is injected from the liquid injection port 11 into the interior of the container body 10. Preferably, the liquid injection port 11 has a corresponding cover body 11C, and the cover body 11C can be a component such as a lid and a plug to seal or expose the liquid injection port 11 according to the requirements. The gas inlet 121 and the gas outlet 12E are arranged on the container body 10, and the gas inlet 121 and the gas outlet 12E communicate with each other to define a circulating fluid-flow space for a working fluid (especially the gas flow generated by the air pump 2). The resonance material is disposed on the container body 10.

The valve unit V is arranged in the containing space S and has an ON state and an OFF state. When the valve unit V is turned off (in the OFF state), the containing space S, especially the space for accommodating the target liquid L, is partially or entirely isolated from the fluid-flow space. When the valve unit V is turned on (in the ON state), the containing space S and the fluid-flow space are no more isolated from each other. It should be noted that the valve unit V can be, for example, a controllable electric valve or an electromagnetic valve and the corresponding structure, which can be understood by the skilled person in the art and thus is not described herein.

Particularly, FIG. 1 and FIG. 2 show the embodiments of two and three fluid supply units 1 in series, respectively. The fluid supply unit 1 located at the head end has an intake pipe 121 connected to the gas inlet 121. A communicating pipe 122 is connected between two adjacent fluid supply units 1, wherein the communicating pipe 122 communicates the gas outlet 12E of a preceding fluid supply unit 1 with the gas inlet 121 of a following fluid supply unit. The fluid supply unit 1 located at the head end has an exit pipe 123 connected to the gas outlet 12E of the fluid supply unit 1.

Particularly, when each of the fluid supply units 1 has the corresponding target liquid L, whether the fluid-flow space is isolated from the specific target liquid L can be determined through the ON state or the OFF state of the valve units V to enable an output flow to have the target ingredients of the target liquids L with one or more specific compositions, wherein the output flow is originated from a working fluid flowing through each of the fluid supply units 1. Particularly, the output flow is outputted to a target device TD through the exit pipe 123. Take FIG. 2 as an example, if the fluid supply units 1 at the head end, the middle, and the tail end respectively possess the target liquids L having a first, a second, and a third kinds of the target ingredients, the output flows including the set of the atomized liquid or the gas formed by vaporizing or atomizing the target liquids having different target ingredients are available by adjusting the ON-OFF states of the valve units. The ON-OFF states of the valve units V and the corresponding target ingredients of the output flow are shown in the following Table 1.

TABLE 1 the ON-OFF states of the valve units and the set of the corresponding target ingredients of the output flow

| set | the valve unit at the head end | the valve unit in the middle | the valve unit at the tail end | the target ingredients in the output flow |
|---|---|---|---|---|
| 1 | ON | OFF | OFF | the first kind (the head end) |
| 2 | OFF | ON | OFF | the second kind (the middle) |
| 3 | OFF | OFF | ON | the third kind (the tail end) |
| 4 | ON | ON | OFF | the first and second kinds (the head end + the middle) |
| 5 | ON | OFF | ON | the first and third kinds (the head end + the tail end) |
| 6 | OFF | ON | ON | the second and third kinds (the middle + the tail end) |
| 7 | ON | ON | ON | the first, second, and third kinds (the head end + the middle + the tail end) |

The air pump 2 is connected with the intake pipe 121 of the fluid supply unit at the head end to cause the working fluid to flow through the gas inlet 121 and the gas outlet 12E of each of the fluid supply units and be outputted from the exit pipe 123 of the fluid supply unit 1 at the tail end to form the output flow mentioned above. Particularly, the output flow acts on a target unit (not shown), enabling the target unit to have greater efficiency corresponding to the specific ingredient contained in the output flow. In other embodiments (not shown), the air pump 2 can also be arranged in the exit pipe 123 of the fluid supply unit 1 at the tail end and the working fluid is inputted from the intake pipe 121 through the air extraction.

The controller 3 is coupled with the valve unit V of each of the fluid supply units 1 and the air pump 2, and controls each of the valve units V to be in the ON or OFF state and the magnitude of the output power of the air pump 2 according to a predefined rule, enabling the output flow to have the target ingredients of the target liquids with the one or more specific compositions and to have a better flow rate.

In the fluid supply device of the present invention, the resonant material can be placed in a resonant device 20 (as shown in FIG. 1 to FIG. 4). The resonant device 20 is disposed on the inner wall 101 of the container body 10. Referring to FIG. 1 to FIG. 4, the position of the resonant device 20 can be either inside or outside the target liquid L (i.e., the resonant device 20 is placed on the outer housing 18 (not shown)), as long as it is close to the target liquid L. The resonant material has an infrared wavelength and a wave frequency of $1.2\times10^{14}$ to $2.7\times10^{14}$ Hz. In a preferable embodiment, the infrared wavelength ranges from 1100 nm to 2500 nm, or from 8 μm to 14 μm. The energy of the resonant material can be transmitted to the target liquid L in the form of waves, thereby causing the molecules of the ingredients in the target liquid L to resonate synchronously at a frequency of $10^{14}$ Hz, and thus molecules of the target liquid L in the different fluid supply units are rearranged to small molecules. The target liquid L with the small molecules results in a larger contact surface area and can therefore be atomized and/or vaporized at lower temperatures, making the target liquid L easier to atomize and/or vaporize, and thus the combustion efficiency of the target liquid L in the internal combustion machine or the external combustion machine is increased. In a preferred embodiment, the resonant material may be a graphene material accommodated in the resonant device 20, a graphene paint applied to the resonant device 20, or a graphene/metal composite material or graphene/metal alloy composite material doped into the material forming the resonant device 20.

In another embodiment, the fluid supply unit 1 of the present invention does not include a resonance device. Instead, the container body 10 of the fluid supply unit 1 contains a resonant material. The resonant material can be a graphene paint 210 applied to the inner wall 101 of the container body 10 (as shown in FIG. 1 to FIG. 2), or graphene/metal composite materials or graphene/metal alloy composite materials (not shown) doped into the materials forming the container body 10. The resonant material in this embodiment also has an infrared wavelength and a wave frequency of $1.2\times10^{14}$ to $2.7\times10^{14}$ Hz. In a preferred embodiment, the infrared wavelength is between 1100 nm and 2500 nm, or between 8 μm and 14 μm. The resonant material can rearrange the molecular size of the target liquid L in each fluid supply unit to small molecules, making the target liquid L easier to atomize and/or vaporize, and thus the combustion efficiency of the target liquid L in internal combustion machine or external combustion machine is increased.

In the above embodiment, the graphene paint is made by adding graphene sheets to various types of coatings (such as epoxy resin, polymer resin, curable mixed resin, and water-based polyurethane coating), wherein the content of the graphene is 0.01-15 wt % of the graphene paint.

In the above embodiment, the graphene/metal composite material can be a graphene/aluminum composite material, which is made by mixing graphene sheets with aluminum powder using various methods, wherein the content of the graphene is 0.1-5.0 wt % of the graphene/metal composite material.

In the above embodiment, the graphene/metal alloy composite material can be a graphene/aluminum alloy composite material or a graphene/steel composite material. In one embodiment, the graphene/aluminum alloy composite material is made by mixing graphene sheets with aluminum alloy powder using various methods, wherein the content of the graphene is 0.1-5.0 wt % of the graphene/aluminum alloy composite material, and the other metal elements in the aluminum alloy include at least one of silicon, iron, copper, manganese, magnesium, chromium, zinc, boron, and other elements. In another embodiment, the graphene/steel composite material is that at least part of the carbon in the steel is provided in the form of graphene, such as 10-90 wt % of the carbon content, preferably 30-90 wt %. The graphene/steel composite material is made by removing part of the non-graphene carbon source in the steel and introducing graphene under an oxygen-free condition, wherein the content of the graphene is 0.6-2.3 wt % of the graphene/steel composite material, and the other metal elements in the steel include at least one of silicon, manganese, phosphorus, iron, and other elements.

Preferably, as shown in FIG. 1 to FIG. 3, the container body 10 of each of the fluid supply units 1 has a divider 13, wherein the divider 13 separates the containing space S into an upper space S1 and a lower space S2. The lower space S2 can be used to accommodate the corresponding target liquid L while the upper space S1 is used to accommodate the gas and/or the atomized liquid formed from the target liquid L. Particularly, the divider 13 is arranged around the inner side of the container body 10 and forms a configuration of a funnel shape which is wide at the top and narrow at the bottom. Particularly, the divider 13 has a connection end 13*a* and a free end 13*b*, wherein the connection end 13*a* is connected with one point/region of the inner side of the container body 10, the free end 13*b* extends downward from the connection end 13*a*, and the free end 13*b* forms a division opening 130. Through the divider forms the configuration of the funnel shape from down to up, when there is a corresponding target liquid L (from the liquid droplet which is originally the target liquid L, the atomized liquid droplet, and/or the liquid droplet which is transited from the gaseous state) in the upper space S1, the corresponding target liquid L can be guided by the divider 13 to flow through the division opening 130 to collect in the lower space S2.

In each fluid supply unit 1, the rates of vaporization or atomization of the corresponding target liquids L are different. To display the amount of the corresponding target liquid L in each fluid supply unit 1, a liquid level warning device is disposed on the outer housing 18 of each fluid supply unit 1. In one embodiment, the liquid level warning device can be a liquid level displaying tube (not shown in the figure) connected to the containing space S, wherein the liquid level displaying tube has a float ball floating on the target liquid L. The liquid level displaying tube is made of a transparent material and displays the level height of the target liquid L based on the position of the float ball.

In another embodiment, the liquid level warning device can be a liquid level warning lamp 181 coupled to the controller 3 for emitting a warning light related to the level height of the target liquid L. After the target liquid L is injected into the container body 10 through the liquid injection port 11 of the fluid supply unit 1, the target liquid L has a level height H1 in the lower space S2. The level height H1 gradually decreases via vaporization or atomization. When level height H1 drops to a critical height H2 (e.g., one-quarter of the total height), the liquid level warning lamp 181 emits a warning light to indicate that the amount of the target liquid L is running low. After the liquid level warning lamp 181 emits the warning light, the cover body 11C of the fluid supply unit 1 can be opened, and the target liquid L can be injected into the container body 10 through the liquid injection port 11 for replenishment.

In one embodiment of the present invention, the controller 3 can calculate the time required for the level height H1 of each target liquid L to fall below the critical height H2 after vaporization or atomization, based on the type of the target liquid L. When the required time is arrived, the controller 3 controls the corresponding liquid level warning lamp 181 of the target liquid L that has fallen below the critical height H2 to emit the warning light, indicating that the fluid supply unit 1 with insufficient target liquid L needs to be replenished. In another embodiment, the controller 3 can also calculate a consumption of each target liquid L during a working time of each fluid supply unit 1 (e.g., 360-500 hours). When the working time expires, the controller 3 controls the liquid level warning lamp 181 to emit a warning light, indicating that the fluid supply unit 1 with insufficient target liquid L needs to be replenished.

In another embodiment, the fluid supply unit 1 further includes a liquid level sensor 19 coupled to the controller 3 to sense the level height H1 of the target liquid L. The liquid level sensor 19 can be, for example, an infrared sensor disposed on the upper surface of the inner wall 101 of the container body 10. The infrared sensor can sense the level height H1 of the target liquid L. When the level height H1 falls below the critical height H2, the infrared sensor sends a warning signal to the controller 3, and the controller 3 then controls the liquid level warning lamp 181 to emit a warning light to indicate that the amount of the target liquid L is running low. In another embodiment, the liquid level sensor 19 can also be installed on the side surface of the inner wall 101 of the container body 10, and positioned at the critical height H2. When the level height H1 falls below the critical height H2 and exposes the liquid level sensor 19, the liquid level sensor 19 sends a warning signal to the controller 3, and the controller 3 then controls the liquid level warning lamp 181 to emit the warning light. In another embodiment, the liquid level sensor 19 can also be an ultrasonic sensor, a differential pressure sensor, a capacitive sensor, a DC electrode sensor, or any other type of liquid level sensor, and the present invention is not limited thereto.

Preferably, each of the fluid supply units 1 has a heater 14 arranged around the periphery of the container body 10 to raise a temperature of the containing space S. Particularly, the heater 14 is arranged at the position corresponding to the target liquid L to raise the temperature of the target liquid L in the containing space S efficiently. The target liquid L is heated by the heater 14, such that the vaporization of the target liquid L is facilitated to form the gas having the corresponding target ingredients, and thereby the gas having the corresponding target ingredients can be taken away by the working fluid to enable the output flow to contain the target ingredients with higher concentration. The heater 14 can be a thin-film heater, a thick-film heater, a ceramic heater or various other heaters, which are not limited herein. The heater 14 can be coupled with the controller 3, and thus the heater 14 can heat the containing space S according to the control of the controller 3.

In order to indicate that each fluid supply unit 1 is heating, a heating lamp 182 is disposed on the outer housing 18 of each fluid supply unit 1. The heating lamp 182 can be coupled with the controller 3 to emit a heating light when the heater 14 is heating, thus showing that the respective fluid supply unit 1 is being heated. Preferably, each fluid supply unit 1 has a temperature sensor 141 disposed on the inner wall 101 of the container body 10 and coupled with the controller 3. The temperature sensor 141 can sense the temperature of the respective target liquid L or the containing space S and transmit the sensed temperature to the controller 3. The controller 3 determines whether to control the heater 14 for heating according to the sensed temperature. The temperature sensor 141 can be configured to detect the temperature of the upper space S1, the lower space S2, or the target liquid L. The temperature sensor 141 may be a bimetallic thermometer, a glass liquid thermometer, a pressure thermometer, a resistance thermometer, a thermistor, a thermocouple, or other types of temperature sensors, and the present invention is not limited thereto.

Preferably, each of the fluid supply units 1 has a heat insulation layer 15 arranged around the periphery of the container body 10 to maintain the temperature in the containing space S. More preferably, the heater 14 is arranged between the container body 10 and the heat insulation layer 15. The heat insulation layer 15 maintains the gas formed by vaporizing the target liquid L in the gaseous state, and thereby the gas can be taken away by the working fluid to enable the output flow to contain the target ingredients with higher concentration. The heat insulation layer 15 can be an asbestos manufacture, a glass wool manufacture, a plastic manufacture, a rubber manufacture or other heat insulating materials, which are not limited herein.

Preferably, each of the fluid supply units 1 has an oscillator 16, arranged on the periphery of the container body 10, particularly at the position corresponding to the target liquid L, for causing the container body 10 to generate the corresponding oscillation to mix the ingredients of the target liquid L uniformly. The oscillator 16 can be an ultrasound oscillator, which is, for example, a vibration motor generating high frequency (particularly, the frequency is not less than 20 kHz). The oscillator 16 can be coupled with the controller 3.

Preferably, each of the fluid supply unit 1 has an atomizer 17 arranged in the container body 10 to cause the target liquid L to form an atomized liquid, especially to cause the atomized liquid to be ejected towards the gas inlet or the gas outlet. The atomizer 17 enables the target liquid to form the atomized liquid to distribute in the gas uniformly, and thereby the gas with the atomized liquid can be taken away by the working fluid to enable the output flow to contain the target ingredients with higher concentration. The atomizer 17 can be an ultrasound atomizer that turns the corresponding liquid into atomized liquid droplets through a high-frequency oscillatory atomizer plate. The atomizer 17 can be coupled with the controller 3.

Preferably, the fluid supply device further includes a first sensor 4 arranged in the exit pipe 123 of the fluid supply unit 1 at the tail end to detect a flow rate and a pressure of the output flow in an interior of the exit pipe 123. The first sensor 4 can be coupled with the controller 3. The controller 3 adjusts/controls the output power of the air pump 2 and the ON-OFF state of each of the valve unit V based on the predefined rule according to the flow rate and the pressure of the output flow obtained by the first sensor 4, and correspondingly controls one or more of the heater 14, the oscillator 16 and the atomizer 17 of each of the fluid supply units 1.

Preferably, the controller 3 is further coupled with a second sensor (not shown). The second sensor is specifically exploited to sense operating information of an operating state of the target device TD, and according to the operating information obtained by the second sensor and optionally according to the feedback signal from the first sensor, the controller 3 adjusts/controls the output power of the air pump 2 and the ON-OFF state of each of the valve units V based on the predefined rule and/or controls one or more of the heater 14, the oscillator 16, and the atomizer 17 of the fluid supply units 1.

In another embodiment, the controller 3 may also be coupled with a detection device (not shown), which is disposed on the target device TD, wherein the detection device is configured to detect feedback information from the target device TD. The controller 3 can adjust/control the output power of the air pump 2, time of the ON-OFF state of each valve unit V, and/or control at least one of the heater 14, the oscillator 16, and atomizer 17 of each fluid supply unit 1 based on predefined rule according to the feedback information acquired by the detection device, and optionally based on the information feedback from the first sensor 4 or optionally based on the operational information acquired from the second sensor, to change a supply amount of different target ingredients. The feedback information includes an oxygen content in the exhaust gas, a fuel injection amount at the nozzle, a boiler gas consumption, a circulating water (tank) temperature, an exhaust temperature, etc. The controller 3 of the present invention may use algorithms to continuously change the supply amount of different target ingredients. Therefore, the controller 3 in the present invention can adjust the supply volume of the target liquid according to the predefined rule based on the obtained information from at least one of the detection device, the first sensor and the second sensor, so that the internal/external combustion machine can achieve the best combustion efficiency. Accordingly, the present invention is an improvement from supplying a micro and fixed amount of vaporized target ingredients to supplying a micro and variable amount of vaporized target ingredients according to the condition of the target device.

In particular, in a specific embodiment, the controller 3 can be an artificial intelligence (AI) server.

Particularly, in one specific embodiment, the target device TD can refer to a whole or a part of an internal combustion machine or an external combustion machine. Specifically, the target device TD can refer to one of the intake manifold of the internal/external combustion machine, the engine of the internal combustion machine, and the combustion chamber of the external combustion machine. The target liquid L can be a combustion adjuvant (the target ingredients is the liquid of the combustion adjuvant), and the fluid supply units 1 are those having ingredients of different combustion adjuvants. When the target device TD is a intake manifold, the second sensor can be mounted in the intake manifold to sense the flow rate and the pressure of the fluid in the intake manifold, especially to sense the concentration of the ingredients of the target liquid (the combustion adjuvant) in the intake manifold; and when the target device TD is the engine of the internal combustion machine or the combustion chamber of the external combustion machine, the second sensor can be exploited to sense a rotating speed of the engine or a current firepower stage of the external combustion machine. Optionally, the second sensor can sense at least one of (A) the flow rate and the pressure of the fluid in the intake manifold, (B) the concentration of the target ingredients, (C) the rotating speed of the engine, (D) the firepower stage, and (E) the species and the concentration of the gases exhausted by the internal/external combustion machine, and the controller 3 adjusts/controls the output power of the air pump 2 and the ON-OFF state of each of the valve units V, and/or controls one or more of the heater 14, the oscillator 16 and the atomizer 17 of each of the fluid supply units 1 based on the predefined rule according to the operating information obtained by the second sensor which is optionally combined with the feedback signal of the first sensor 4.

On the basis of the usage of internal/external combustion machine of the present specification as mentioned above, the devices in the prior art have a single supply unit for a combustion adjuvant to offer only one kind of ingredients of a combustion adjuvant. Thereby, the devices in the prior art can efficiently improve the operating efficiency of the internal/external combustion machine only when the power of the combustion chamber is within a certain range and cannot efficiently improve the efficiency of the internal/external combustion machine for different changes of the power. In this respect, based on the connection of a plurality of fluid supply units in series, different target liquids L (different ingredients of the combustion adjuvants) in each of the fluid supply units 1 and the configurations of the valve units V and the corresponding flow channel (such as the fluid-flow space formed by the intake pipe 121, the communicating pipe 122 and the exit pipe 123), the present invention offers the best combination of combustion adjuvants (as shown in Table 1) for all kinds of combustion requirement/power to optimize the overall operating efficiency of the combustion chamber.

Figure 5:
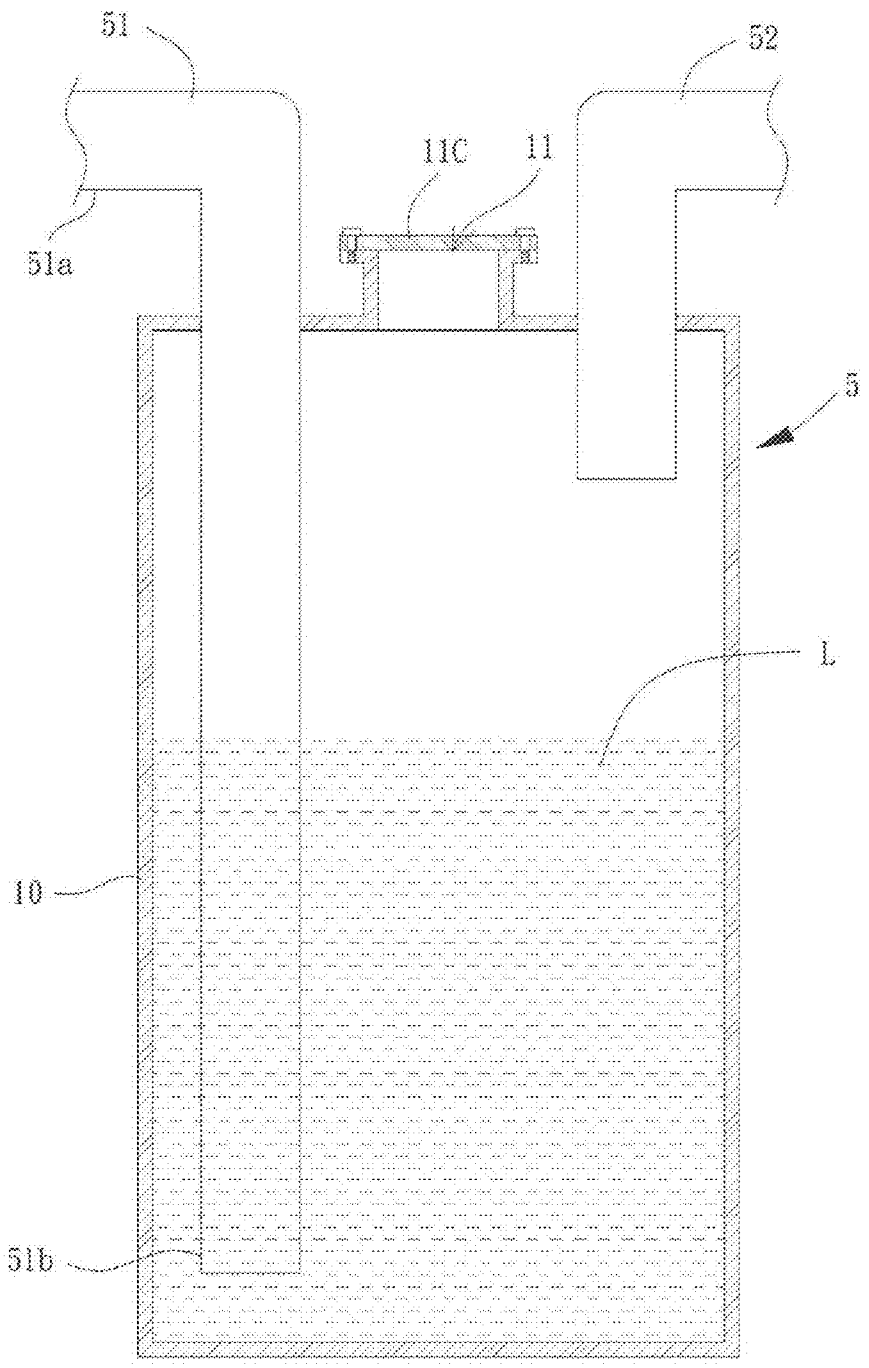
FIG. 5 shows the front section view of the fluid supply unit of the present invention according to another embodiment.

Please refer to FIG. 5, which is another embodiment of the fluid supply unit 5 of the present invention. This embodiment is roughly the same as the embodiments of the fluid supply unit 1 in FIG. 1 to FIG. 4. In this embodiment, the fluid supply device includes a fluid supply unit 5, an intake pipe 51 and an exit pipe 52. The fluid supply unit 5 has a container body 10, and the container body 10 has a containing space S to accommodate a target liquid L having a liquid surface and target ingredients. The intake pipe 51 is mounted on the fluid supply unit 5, and has an entrance 51*a* outside the container body 10 for flowing therethrough the working fluid and an exit end 51*b* arranged underneath the liquid surface of the target liquid L in the container body 10. Preferably, the exit end 51*b* is arranged near a bottom of the container body 10. The exit pipe 52 communicates with the containing space S in the container body 10. The fluid supply unit 5 also includes an outer housing 18, a liquid level warning lamp 181, a heating lamp 182, a liquid level sensor 19 and a temperature sensor 141 as shown in FIG. 1 to FIG. 4. When the working fluid is ejected out of the exit end 51*b* of the intake pipe 51 and then sprayed into the target liquid L, the target liquid L is vaporized and atomized to pass through the exit pipe 52, so that the vaporized and atomized target liquid L contains target ingredients with higher concentration. In addition, the liquid level warning lamp 181 and the heating lamp 182 also light up when necessary to indicate that the target liquid L is running low and is in the heating state, respectively.

Particularly, by configuring the fluid supply unit 5 as above, the fluid supply unit 5 can cause the target liquid L to generate vaporization and atomization to a considerable extent even in absence of the heater 14 and the atomizer 17. In addition, it should be noted that under the configuration of the fluid supply unit 5, the fluid supply unit 5 can optionally have at least one of the divider 13, the heater 14, the heat insulation layer 15, the oscillator 16 and the atomizer 17. Particularly, the overall vaporization can be enhanced while the heater 14 is further included; and the overall atomization can be enhanced while the atomizer 17 is further included. In addition, a certain extent of disturbance or flowing can be generated and the mixing uniformity of the target ingredients can be raised in the target liquid L by ejecting the gas into the target liquid L. Similarly, the overall mixing uniformity of ingredients can be enhanced while the oscillator 16 is further included.

Figure 6:
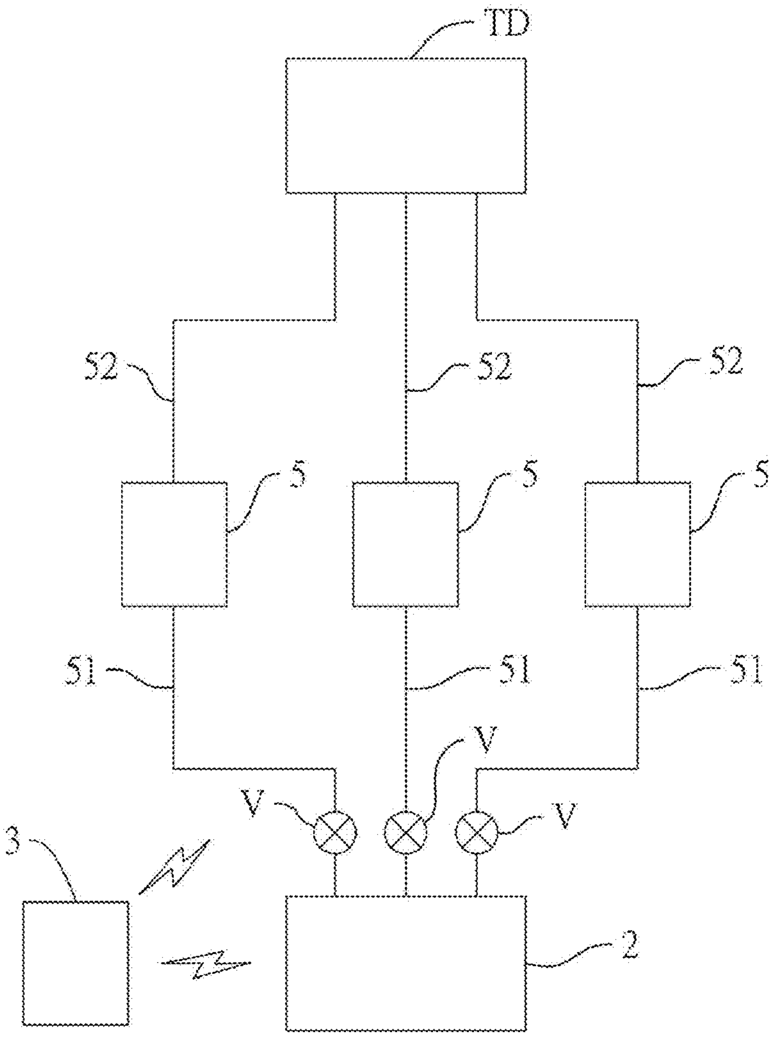
FIG. 6 shows the schematic diagram of the fluid supply device composed of a plurality of fluid supply units in FIG. 5.

Please refer to FIG. 6, which shows a schematic diagram of the fluid supply device of the present invention according to another embodiment. The fluid supply device includes a plurality fluid supply units 5 arranged in parallel. The intake pipes 51 of each of the fluid supply units 5 are connected with an air pump 2, and the exit pipe 52 of each of the fluid supply units 5 are connected with a target device TD. The air pump 2 drives the working fluid to flow through the fluid supply unit 5 via the intake pipe 51 and then flow into the target device TD via the exit pipe 52. Each of the fluid supply units 5 further includes the corresponding valve unit V having an ON state and an OFF state. When the corresponding valve unit V is in the OFF state, the air pump 2 cannot drive the working fluid to be outputted from the exit pipe 52; and when the corresponding valve unit V is in the ON state, the air pump 2 can drive the working fluid to be outputted from the exit pipe 52. Preferably, the controller 3 is coupled with the air pump 2 and the valve units V of each of the fluid supply unit 5 to control the magnitude of the output power of the air pump 2 and the ON-OFF states of the valve units V, so that the output fluid flowing out of the exit pipe 52 may have the target ingredients of the target liquid L with a specific composition and have a better flowing rate.

In an embodiment of the present invention, the target liquid L can be a photocatalyst liquid. The photocatalyst liquid can be used as a combustion adjuvant for the internal and external combustion machines to improve the combustion efficiency of a fuel.

In another embodiment of the present invention, the photocatalytic liquid is includes a noble metal nanoparticle being in a weight percentage of 0.01-0.2 wt. % of the photocatalytic liquid, and including a silver nanoparticle; a photocatalytic nanomaterial being in a weight percentage of 0.01-25 wt. % of the photocatalytic liquid, and including at least one of a titanium nanoparticle and a tungsten trioxide nanoparticle; a dispersant in a weight percentage of 0.01-5 wt. % of the photocatalytic liquid; and a balance of a solvent.

The photocatalytic liquid may further comprise at least one of a silicon dioxide, a transition metal oxide, and a copper-containing oxide, wherein the silicon dioxide is in a weight percentage of 1-25 wt. % of the photocatalytic liquid, the transition metal oxide is in a weight percentage of 0.001-0.02 wt. % of the photocatalytic liquid, the copper-containing oxide is in a weight percentage of 0.001-0.02 wt. % of the photocatalytic liquid, the transition metal oxide is one of a cerium dioxide and a manganese dioxide, and the copper-containing oxide is one of a cuprous oxide and a copper peroxide. The heat resistance property of silicon dioxide can increase the thermal stability of the photocatalytic nanomaterial when subject to heat (such as burning in the combustion chamber of an internal or external combustion engine), and lower the energy required for the photocatalytic reaction to enhance the photocatalytic activity of the photocatalytic nanomaterial.

By means of the noble metal nanoparticles included therein, not only the performance of the photocatalytic nanomaterial can be improved, but also the disadvantage of the weak absorption of visible light to the photocatalytic nanomaterial is overcome. Therefore, the photocatalytic liquid can be used as a combustion promoter to utilize the light source generated by the combustion reaction to decompose the water generated by the combustion reaction into hydrogen and oxygen, which can be further used for enhancing the combustion reaction, thereby achieving the effect of increasing the combustion efficiency of an internal or external combustion engine.

In the photocatalytic liquid of the present invention, the noble metal nanoparticle may further include a platinum nanoparticle, a palladium nanoparticle or a combination thereof. In addition to having the same properties as the silver nanoparticles, the platinum nanoparticle and the palladium nanoparticle can also reduce carbon monoxide (CO), hydrocarbons (HC), and nitrogen oxides ($NO_x$) produced because of incomplete combustion of the fuel into carbon dioxide ($CO_2$) and nitrogen ($N_2$) respectively, thereby decreasing missions of exhaust gases and controlling air pollution.

In the photocatalytic liquid of the present invention, the concentration of the noble metal silver nanoparticle can be in the range between 100 and 2,000 ppm (i.e., its weight percentage is 0.01 to 0.2 wt. %), preferably between 200 and 1,500 ppm (i.e., 0.02 to 0.15 wt. %), and more preferably between 500 and 1,000 ppm (i.e., 0.05 to 0.1 wt. %). Therefore, by providing a specific concentration range of the silver nano particle in the photocatalytic liquid, the photocatalytic performance of the photocatalyst nanomaterial can be effectively promoted while the cost of the incorporated noble metal can also be effectively controlled. In addition, experiments have shown that the noble metal nanoparticle having a concentration higher than 3,000 ppm will adhere to the surface of the photocatalytic nanomaterial, so as to reduce the specific surface area (as defined by Brunauer- Emmett-Teller Specific Surface Area, BET) of the photocatalytic nanomaterial and to reduce the photocatalytic activity of the photocatalytic nanomaterial.

In the photocatalytic liquid of the present invention, the concentration of the platinum nanoparticle and/or the palladium nanoparticle, if present, can be in the range between 10 and 200 ppm (i.e., 0.001-0.02 wt. %) respectively. Experiments have shown that, by providing a specific concentration range of the platinum nanoparticle and/or the palladium nanoparticle in the photocatalytic liquid, the photocatalytic performance of the photocatalytic nanomaterial can be effectively promoted while the cost of the incorporated noble metal can be effectively controlled, and the substances in the exhaust emission resulting from incomplete combustion can be decreased.

In the photocatalytic liquid of the present invention, the dispersant is selected from a long carbon chain ammonium salt, a long carbon chain oleylamine (OLA), a long carbon chain thiol, a long carbon chain sodium sulfate, a long carbon chain silane, or other high molecular weight dispersants. The average molecular weight of the suitable dispersant is in the range of 200 to 10,000. The long carbon chain ammonium salt is, for example, ammonium polyacrylate ($NH_4PAA$). The long carbon chain oleylamine (OLA) is $C_{18}H_{35}NH_2$. The long carbon chain sodium sulfate is sodium dodecyl sulfate (SDS). The long carbon chain thiol is 1-dodecanethiol. The long carbon chain silane is octadecyltrimethoxysilane (OTMS). Other high molecular weight dispersants may be selected from polyamines, polyoxyethylene imides (POE-imides), polyoxyalkylene segmented amido acids (POA-segmented amido acids), polyoxyalkylene imides (POA-imides), polyacrylic acids, and multi-branched polyethylene glycols. The general formula of a polyamine is $NH_3—(CH_2)_a—NH_3$, $NH_3—(CH_2)_a—(NH)_m—(CH_2)_b—NH_3$ or $NH_3—(CH_2)_a—(NH)_m—(CH_2)_b—(NH)_n(CH_2)_c—NH_3$, and so on. The general formula can be simplified to $NH_3—(CH_2)_x—(NH)_y—NH_3$, where x=a+b+c, y=m+n, and a, b, c, m, n, x, y are the numbers of corresponding chemical groups (such as $CH_2$ or NH) in the general formula. The multi-branched polyethylene glycol is selected from 4arm PEG, 3arm hydroxyl, 1arm amine, 4arm PEG, 3arm hydroxyl, 1arm amine, HCl Salt (pentaerythritol); 4arm PEG, 3arm methoxy, 1arm NHS ester; and 4arm PEG, 3arm hydroxyl, 1arm acetic acid. In particular, the side chains can utilize their functional groups to increase adsorption on the surfaces of the catalytic particles and utilize steric stabilization to increase dispersion stability. Optionally, the dispersant may further include/be added with polycarbonate serving as a second dispersant.

In the photocatalytic liquid of the present invention, the solvent can be selected from water or liquid alcohol, and the liquid alcohol can be selected from ethanol, ethylene glycol, isopropanol or glycerol. The solvent is preferably water, ethanol, isopropanol or glycerol, more preferably water. The solvent has an amount being the remaining proportion (i.e., the balance) of the photocatalytic liquid after deducting the amount of the other above-mentioned components. Experiments have shown that, by selecting the solvent, the dispersibility of the photocatalytic liquid can be increased by the polarity of the solvent itself. The dispersibility can be measured by a zeta potential analyzer, and the zeta potential of the photocatalytic liquid according to the present invention is greater than 20 mV, indicating good dispersibility.

In order to prove that the photocatalytic liquid as described above, for example including silicon dioxide, titanium dioxide, and silver and platinum, can indeed improve the combustion efficiency of an internal or external combustion engine, the photocatalytic liquid is heated and atomized, and then enters the combustion chamber of an internal or external combustion engine with the air to mix with fuel. The combustion efficiency of the fuel for each engine installed with the energy-saving equipment is shown in Table 2 as follows.

TABLE 2

Average fuel saving efficiency on gasoline and diesel engines

| Engine of Vehicle/ Boiler/ Generator | Energy-Saving Equipment installed | Consumption Ratio of Fuel/Air before installation (L/100 km) | Consumption Ratio of Fuel/Air after installation (L/100 km) | Percentage Saved (%) |
|---|---|---|---|---|
| Toyota Altis, 1.8 L, sedan | ECO-0 | 4.8 | 3.8 | 20.8 |
| KIA Cerato, 1.6 L, rental car | ECO-0 | 8.4 | 7.2 | 14.3 |
| JAC Refine, 2.4 L, light duty vehicle | ECO-0 | 12.5 | 10.5 | 16 |
| Volkswagen Jetta, 1.5 L, sedan | ECO-0 | 8.1 | 6.9 | 14.8 |
| JAC Refine, 1.6 L, light duty vehicle | ECO-0 | 8.3 | 7.1 | 14.5 |
| Wuling Hongguang, 1.5 L, light duty vehicle | ECO-0 | 9.0 | 7.2 | 20.0 |
| Toyota Corolla, 1.6 L, rental car | ECO-0 | 8.5 | 7.0 | 17.6 |
| Volkswagen Santana, 1.6 L, rental car | ECO-0 | 7.8 | 7.0 | 10.3 |
| Xiali V5, 1.5 L, rental car | ECO-0 | 7.2 | 5.9 | 18.0 |
| Xiali V5, 1.5, rental car | ECO-0 | 7.7 | 6.5 | 15.6 |
| Xiali Vizi V5, 1.5 L, rental car | ECO-0 | 7.2 | 6.2 | 13.9 |
| Shaanxi Auto DeLong M3000, 375 hp, diesel heavy truck | ECO-0 | 35.0 | 31.0 | 11.4 |
| Shaanxi Auto DeLong M3000, 400 hp, diesel heavy truck | ECO-0 | 38.2 | 35.0 | 8.4 |
| Shaanxi Auto DeLong M3000, 400 hp, diesel heavy truck | ECO-0 | 34.5 | 31.6 | 8.2 |
| Shaanxi Auto DeLong M3000, 460 hp, diesel heavy truck | ECO-0 | 35.1 | 31.1 | 11.4 |
| Jiefang Auto JH6, 550 hp, diesel heavy truck | ECO-0 | 40.2 | 35.5 | 11.7 |
| CNHTC SITRAK, 440 hp, diesel heavy truck | ECO-0 | 39.8 | 37.5 | 5.8 |
| Dongfeng Chenglong M5, 375 hp, diesel heavy truck | ECO-0 | 31.6 | 28.0 | 11.4 |
| Mercedes-Benz, 440 hp, diesel heavy truck | ECO-0 | 35.1 | 32.2 | 8.3 |
| Scania P340, 340 hp, diesel heavy truck | ECO-0 | 29.1 | 26.5 | 8.9 |
| Ningbo Bus Ningtong, 375 hp, diesel bus | ECO-0 | 38.9 | 35.1 | 9.8 |

TABLE 2-continued

Average fuel saving efficiency on gasoline and diesel engines

| Engine of Vehicle/ Boiler/ Generator | Energy-Saving Equipment installed | Consumption Ratio of Fuel/Air before installation (L/100 km) | Consumption Ratio of Fuel/Air after installation (L/100 km) | Percentage Saved (%) |
|---|---|---|---|---|
| Xinjiang Heishan Tonly Heavy Industries, 430 hp, coal mine truck | ECO-0 | 225 | 193 | 14.2 |
| Kaohsiung Chikuo Ferry 1 | ECO-0 | Fuel consumption per hour: 58.8 L | Fuel consumption per hour: 54.6 L | 7.1 |
| Hong Kong Star Ferry 1 | ECO-0 | Fuel consumption per hour: 46.3 L | Fuel consumption per hour: 42.8 L | 7.6 |
| Keelung CT3 lighted fishing boat | ECO-0 | Fuel consumption per hour: 60.8 L | Fuel consumption per hour: 55.8 L | 8.2 |
| Kaohsiung 3.5 tons gas-fired boiler | ECO-0 | Time required for water vapor pressure increased from 0 to 7 kg: 554 sec. | Time required for water vapor pressure increased from 0 to 7 kg: 519 sec. | 6.8 |
| Tienjin 1 ton, gas-fired boiler | ECO-0 | Time required for water vapor pressure increased from 0 to 7 kg: 978 sec. | Time required for water vapor pressure increased from 0 to 7 kg: 893 sec. | 8.7 |
| Yuchai 300 kw diesel generator | ECO-0 | Fuel consumption per hour: 80.8 L | Fuel consumption per hour: 74.9 L | 7.4 |
| Yuchai 200 kw diesel generator | ECO-0 | Fuel consumption per hour: 55.1 L | Fuel consumption per hour: 50.5 L | 8.3 |

As shown in Table 2, after the photocatalytic liquid is heated and atomized by the adjustable energy-saving equipment for an internal combustion engine (i.e., ECO-0) as described in Taiwan Patent Issuance No. M601280, the average fuel saving rate for a gasoline or diesel engine can reach 5.8-20.8%, the steam pressure rise time for a steam boiler can be saved by 6.8-8.7%, and the average fuel saving rate can reach 7.42-8.3% for a diesel generator.

In addition, if the photocatalytic liquid is heated, atomized and then enters the combustion chamber of an external combustion engine along with the air to mix with fuel in the combustion chamber, the air saving rate for a 0.5 ton gas-fired boiler can reach 6-10%.

Furthermore, if the photocatalytic liquid is mixed with a liquid alcohol as a diluent to form the combustion-promoting additive, and then the combustion-promoting additive is mixed with fuel before being introduced into the combustion chamber of the internal combustion engine together, the fuel saving rate for a gasoline engine can reach 5-10%.

If the solvent in the photocatalytic liquid is water, ethanol, ethylene glycol, glycerol or isopropanol, the service life of the photocatalytic liquid can exceed two years without having obvious agglomeration or precipitation.

In view of the above, the fluid supply device for internal/external combustion machine of the present invention can offer the combination of different target liquids according to the actual usage by arranging a plurality of fluid supply units in series or in parallel and configuring the fluid supply units to have different target liquids and the corresponding valve units. In addition, the divider is formed as the funnel shape to collect the target liquid, and more preferably, to facilitate the functions of the corresponding heater, oscillator, and atomizer. In addition, the target liquid is vaporized to the corresponding gas by heating the target liquid using the heater, to increase the concentration of the target ingredients in the output flow. In addition, the target liquid can be atomized to the corresponding atomized liquid through the atomizer, which also helps to increase the concentration of the target ingredients. In addition, the effects of the vaporization, atomization, and uniformization are improved by configuring the intake pipe of the fluid supply unit to be extended into the target liquid. Additionally, through the resonance material, different target liquids L in each of the fluid supply units can be rearranged to smaller molecules, so that the different target liquids L are easier to be atomized and/or vaporized, thereby increasing the combustion efficiency of the target liquid L in the internal or external combustion machine. Therefore, the fluid supply device and fluid supply unit of the present invention can vaporize and atomize the target liquid, so as to be applicable to the internal and external combustion machines (such as natural gas engines and boilers, etc.) that use natural gas as fuel.

Although the present invention has been disclosed through the preferred embodiments mentioned above, they are not intended to limit the present invention. Any skilled person in the art can make all kinds of variations and modifications to the preferred embodiments mentioned above without departing from the spirit or scope of the present invention, which still falls within the scope as covered by the present invention. Thereby, what is covered by the present invention shall include all variations and modification on basis of the appended claims and their equivalents. In addition, while various embodiments mentioned above can be combined with each other, the present invention includes the implementation aspect of any combination.

The invention claimed is:

1. A fluid supply device for increasing combustion efficiency, wherein the fluid supply device is applied to an internal combustion machine or an external combustion machine, the internal combustion machine or the external combustion machine comprises at least one detection device for sensing at least one feedback information, and the fluid supply device comprises:

a controller;

an air pump coupled with the controller;

a plurality of fluid supply units configured in series, having a head end and a corresponding tail end, and each comprising:

an outer housing;

a container body disposed in the outer housing and having an inner wall and a containing space to accommodate a target liquid having target ingredients, wherein the target ingredients of the target liquids in the different fluid supply units are different, the container body has a liquid injection port, a gas inlet and a gas outlet, the liquid injection port is used for injecting therethrough the corresponding target liquid, and the gas inlet communicates with the gas outlet to define a circulating fluid-flow space for a working fluid;

a resonance material disposed on the container body, wherein the resonance material has an infrared wavelength to rearrange molecules of the target liquid in the container body to small molecules;

a valve unit coupled with the controller, arranged in the containing space and having an ON state and an OFF state, wherein when in the OFF state, the containing space is partially or entirely isolated from the fluid-flow space; and when in the ON state, the containing space and the fluid-flow space are no more isolated from each other; and a liquid level warning device disposed on the outer housing for displaying a level height of the respective target liquid;

an intake pipe connected to the gas inlet of the fluid supply unit having the head end;

a communicating pipe connected between two adjacent fluid supply units to cause the gas outlet of a preceding fluid supply unit to communicate with the gas inlet of a following fluid supply unit; and an exit pipe connected to the gas outlet of the fluid supply unit having the tail end, wherein the air pump is connected to the intake pipe or the exit pipe to drive the working fluid to flow through each of the fluid supply units and output from the exit pipe to form an output flow, wherein:

the controller adjusts an output power of the air pump and the ON-OFF state of each of the valve units based on a predefined rule according to the at least one feedback information provided by the at least one detection device, so as to change a supply amount of the different target ingredients.

2. The fluid supply device for increasing combustion efficiency as claimed in claim 1, wherein:

the resonance material is accommodated in a resonant device disposed on the inner wall of the container body, coated on the inner wall, or doped into materials forming the container body;

the resonant material is graphene paint or graphene/metal composite materials; and a wavelength of the infrared is between 1100-2500 nm or between 8-14 μm.

3. The fluid supply device for increasing combustion efficiency as claimed in claim 1, wherein:

the liquid level warning device is a liquid level warning lamp coupled with the controller for emitting a warning light related to the level height of the respective target liquid; or the liquid level warning device is a liquid level displaying tube connected to the containing space for displaying the level height of the respective target liquid in the containing space.

4. The fluid supply device for increasing combustion efficiency as claimed in claim 3, wherein the controller is configured to calculate a required time for the level height of each of the target liquid to be lower than a critical height according to a type of the respective target liquid, and control the liquid level warning lamp to emit the warning light when the required time arrives.

5. The fluid supply device for increasing combustion efficiency as claimed in claim 3, wherein the controller is configured to calculate a consumption of the respective target liquid during a working time of each of the fluid supply unit, and control the liquid level warning lamp to emit the warning light when the working time expires.

6. The fluid supply device for increasing combustion efficiency as claimed in claim 3, wherein each of the fluid supply units comprises a liquid level sensor disposed on the inner wall and coupled with the controller, the liquid level sensor is configured to transmit a warning signal to the controller when the level height is lower than a critical height, and the controller controls the liquid level warning lamp to emit the warning light.

7. The fluid supply device for increasing combustion efficiency as claimed in claim 6, wherein the liquid level sensor is an infrared sensor disposed on an upper surface of the inner wall of the container body, and the infrared sensor is configured to sense the level height of the respective target liquid, and transmit the warning signal to the controller when the level height is lower than the critical height.

8. The fluid supply device for increasing combustion efficiency as claimed in claim 6, wherein the liquid level sensor is disposed on a side surface of the inner wall of the container body and is located at the critical height, and the liquid level sensor transmits the warning signal to the controller when the level height is lower than the critical height, thereby causing the liquid level sensor to be exposed.

9. The fluid supply device for increasing combustion efficiency as claimed in claim 1, wherein each of the fluid supply units has a divider arranged around an inner side of a corresponding container body and forming a configuration of a funnel shape which is wide at the top and narrow at the bottom.

10. The fluid supply device for increasing combustion efficiency as claimed in claim 9, wherein the divider has a connection end and a free end, the connection end is connected with the inner side of the container body, the free end extends downward from the connection end, and the free end forms a division opening.

11. The fluid supply device for increasing combustion efficiency as claimed in claim 1, wherein each of the fluid supply units further comprises:

a temperature sensor disposed on the inner wall of the container body and coupled with the controller to sense a temperature of the target liquid or the containing space, and transmit the temperature to the controller;

a heater coupled with the controller and arranged around the periphery of the container body to raise the temperature of the containing space; and a heating lamp disposed on the outer housing and coupled with the controller to emit a heating light when the heater is heating.

12. The fluid supply device for increasing combustion efficiency as claimed in claim 1, wherein each of the fluid supply units has a heat insulation layer arranged around the periphery of the container body and the heater is arranged between the container body and the heat insulation layer.

13. The fluid supply device for increasing combustion efficiency as claimed in claim 1, wherein each of the fluid supply units has an oscillator coupled with the controller for causing the corresponding container body to generate a corresponding oscillation.

14. The fluid supply device for increasing combustion efficiency as claimed in claim 1, wherein each of the fluid supply units has an atomizer arranged in the container body and coupled with the controller to cause the target liquid to form the atomized liquid when the container body has the corresponding target liquid.

15. The fluid supply device for increasing combustion efficiency as claimed in claim 1, further comprising:

a first sensor coupled with the controller and arranged in the exit pipe of the fluid supply unit having the tail end to detect a flow rate and a pressure of the output flow in an interior of the exit pipe, wherein the controller adjusts the output power of the air pump and a time of the ON-OFF state of each of the valve units based on the predefined rule according to the flow rate and the pressure of the output flow obtained by the first sensor.

16. The fluid supply device for increasing combustion efficiency as claimed in claim 1, further comprising:

a second sensor arranged in a target device to sense operating information of an operating state of the target device, wherein:

the output flow is outputted to the target device through the exit pipe;

the controller adjusts the output power of the air pump and a state of each of the valve units based on a predefined rule according to the operating information obtained by the second sensor, wherein a first instance of the operating information is that:

when the target device is an intake manifold, the operating information is a flow rate and a pressure and/or concentration of the target ingredients of a fluid in the intake manifold;

when the target device is an engine of the internal combustion machine, the operating information is a rotating speed of the engine of the internal combustion machine;

when the target device is a combustion chamber of the external combustion machine, the operating information is a firepower stage of the combustion chamber of the external combustion machine; and when the target device is the internal combustion machine or the external combustion machine, the operating information includes species and concentration of gases exhausted by the internal combustion machine or the external combustion machine; or a second instance of the operating information is at least one of (A) the flow rate and the pressure of the fluid in the intake manifold, (B) the concentration of the target ingredients of the fluid in the intake manifold, (C) the rotating speed of the engine of the internal combustion machine, (D) the firepower stage of the combustion chamber of the external combustion machine, and (E) the species and the concentration of the gases exhausted by the internal combustion machine or the external combustion machine.

17. The fluid supply device for increasing combustion efficiency as claimed in claim 1, wherein each of the target liquids is a combustion adjuvant.

18. A fluid supply unit for increasing combustion efficiency, comprising:

an outer housing;

a container body disposed in the outer housing and having an inner wall and a containing space to accommodate a target liquid having a liquid surface and target ingredients, wherein the container body has a resonance material having an infrared wavelength to rearrange molecules of the target liquid in the container body to small molecules;

a liquid level warning device disposed on the outer housing to display a level height of a target liquid in the container body; and an intake pipe mounted on the container body and having an entrance end and an exit end, wherein:

the entrance end is to flow therethrough a working fluid; and the exit end is arranged underneath the liquid surface; and an exit pipe communicating with the containing space in the container body.

19. A fluid supply device for increasing combustion efficiency, wherein the fluid supply device is applied to an internal combustion machine or an external combustion machine, the internal combustion machine or the external combustion machine comprises at least one detection device for sensing at least one feedback information, and the fluid supply device comprises:

a controller;

an air pump coupled with the controller; and a plurality of fluid supply units as claimed in claim 18 disposed in parallel, each further comprising a corresponding valve unit coupled with the controller, wherein:

the intake pipe of each of the fluid supply units is connected with the air pump;

the exit pipe of each of the fluid supply units is connected with a target device;

each of the valve units has an ON state and an OFF state, wherein:

when in the OFF state, the air pump stops driving the working fluid to flow out of the exit pipe; and when in the ON state, the air pump drives the working fluid to be outputted from the exit pipe;

the controller controls a magnitude of an output power of the air pump and the ON-OFF state of each of the valve units; and the controller adjusts the output power of the air pump and the ON-OFF state of each of the valve units based on a predefined rule according to the at least one feedback information provided by the at least one detection device, so as to change a supply amount of the different target ingredients.

20. The fluid supply device for increasing combustion efficiency as claimed in claim 19, wherein:

the resonance material is a graphene paint coated on the inner wall, or graphene/metal composite materials doped in materials forming the container body; and a wavelength of the infrared is between 1100-2500 nm or between 8-14 μm.

* * * * *